July 6, 1954   A. KUPCHIK   2,682,830
GRIDIRON
Filed March 12, 1953
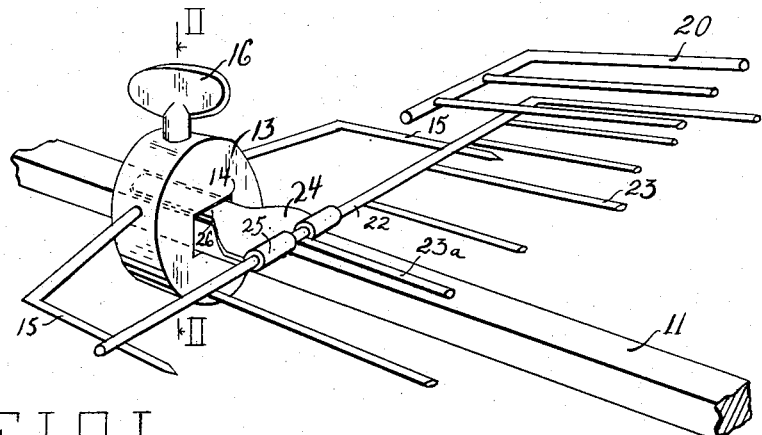
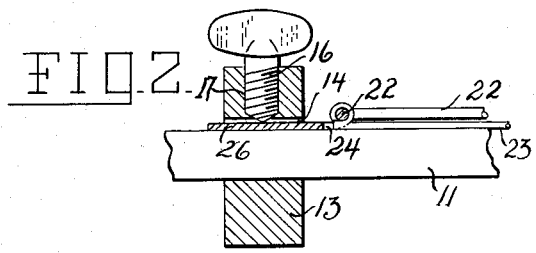
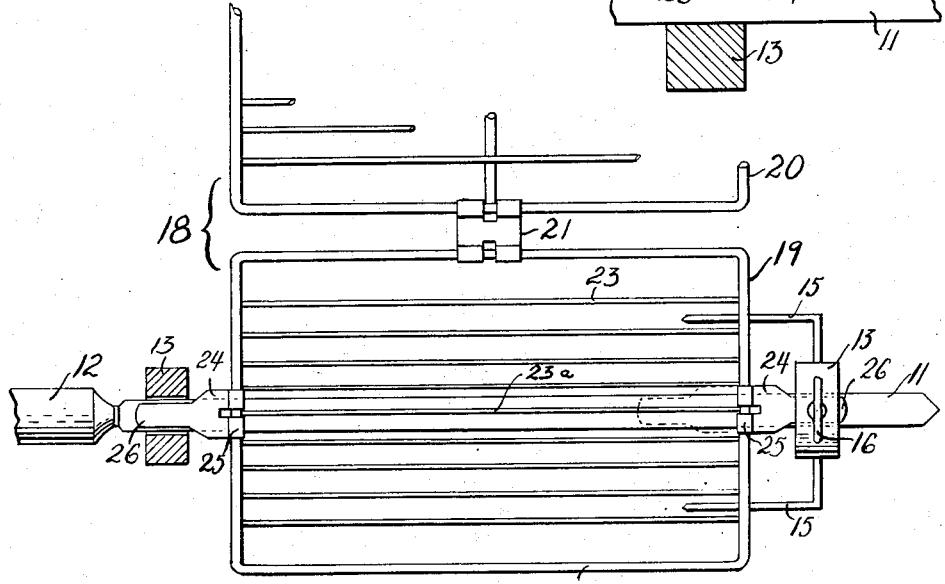
INVENTOR:
ABRAHAM KUPCHIK
BY Richardson, David and Nordon
ATTORNEYS

Patented July 6, 1954

2,682,830

UNITED STATES PATENT OFFICE 2,682,830

GRIDIRON

Abraham Kupchik, Brooklyn, N. Y.

Application March 12, 1953, Serial No. 341,863

4 Claims. (Cl. 99—397)

1

The present invention relates to a gridiron for use with a spit, and more particularly to a combination of a gridiron with prong-carrying slide clamps for use with spits having a flat surface, such as the square cross-section spits which are extensively used in so-called infrared automatic rotisseries.

Such automatic rotisseries are usually provided with a spit of square cross-section and prong-carrying slide clamps formed to embrace the spit and including setscrews passing through tapped bores in the slide clamps for securing the slide clamps in desired position on the spit with the prongs penetrating and holding the meat threaded on the spit for roasting.

For meat that cannot be threaded on the spit, a gridiron-spit unit is available which consists of two rectangular grids containing means for securing them together in superposed registering positions, one of said grids being welded or otherwise permanently secured to a separate spit member. Such gridiron-spit unit with its extra spit and handle necessitates a considerable increase in the cost of the equipment. Furthermore, the gridiron with the spit to which it is permanently secured constitutes a large, bulky unit of awkward shape which is inconvenient to store when not in use, and which is difficult to clean.

The principal object of the present invention is to eliminate these disadvantages by providing a combination of prong-carrying slide clamps with a gridiron which can be attached to the ordinary spit by means of the slide clamps.

Another object of the invention is to provide a gridiron which can be attached to an ordinary spit by means of suitably formed prong-carrying slide clamps in a very simple manner and which, when detached, can be easily cleaned and requires little storage space.

Still another object of the invention is to provide a gridiron for attachment to a spit having a flat surface by means of prong-carrying slide clamps, said gridiron being simple and inexpensive to manufacture and easy to use.

These and other objects, which will appear more clearly as the specification proceeds, are accomplished by the combination and arrangement of elements set forth in the following detailed description, defined in the appended claims and illustratively exemplifier in the accompanying drawings, in which:

Fig. 1 is a partial perspective view of an assembly of a spit, prong-carrying slide clamps and a gridiron according to the present invention;

2

Fig. 2 is a partial section taken on line 2—2 of Fig. 1; and

Fig. 3 is a top view of the combination, some parts being shown in a section and other parts being broken away.

In the figures, 11 indicates a spit of substantially square cross-section and having a handle 12 shown at the left hand end of the spit in Fig. 3. The reference numeral 13 denotes two slide clamps which embrace the spit 11. According to the invention a certain clearance 14 is provided between the slide clamps 13 and the surface of the spit 11. The clamps 13 carry the usual prongs 15 pointing toward each other and adapted to penetrate into meat or fowl threaded on the spit. Setscrews 16 pass through tapped holes 17 in the slide clamps 13 and are adapted to engage with their tips, the flat top surface of the spit 11 to secure the clamps 13 to the spit 11 in any desired positions.

The gridiron according to the present invention is generally designated by the reference numeral 18. As usual, it consists of two grids 19 and 20 hinged together at one side by a hinge 21 so that the two grids can be folded upon each other in registering positions and then be secured together by means not shown. The grid 19 is formed by a rectangular wire frame 22 and spaced apart parallel bars 23 formed of wire of smaller cross-section and extending lengthwise across said frame. The wire bars 23 overlie the frame on its outside, that is, on the side thereof facing away from the grid 20 when the two grids 19 and 20 are folded into registering positions, and are secured to the outside of the frame 22, for instance by welding. The bars 23 define the outer surface of the grid 19, that is no element of the grid projects downwardly, as shown in Fig. 2, beyond the bars 23. A central bar 23a extends in a plane which bisects the grid 19 at right angles thereto.

The grid 19 carries at its opposite ends two sheet metal tongues 24, each having a forked portion 25 straddling the central bar 23a from the outside and being wrapped around the wire forming the frame 22. As will be seen, particularly in Fig. 3, the tongues 24 are so arranged that in each position thereof they are bisected by the plane containing the central bar 23a.

The tongues 24 are adjustable to operative positions shown in Figs. 1, 2 and in full lines in Fig. 3, and each tongue has a flat terminal strip portion 26 of a thickness not exceeding the thickness of the bars 23 (see particularly Fig. 2) and less than the clearance 14 between the surface of the spit 11 and the slide clamps 13. In operative positions of the tongues 24, the terminal strip portions 26 of the tongues 24 project outwardly from the grid 19 in opposite directions with their outer surfaces lying in a plane coinciding substantially with the outer surface of the grid 19. The strip portions 26 have a substantially uniform width slightly less than that of the flat top surface of the spit 11 and a length considerably exceeding their width. In order to attach the gridiron 18 to the spit 11, the tongues 24 are adjusted to their operative positions and the grid 19 with the extended tongues 24 is placed on the upper flat surface of the spit 11 with the outer surfaces of the grid 19 and the outer surfaces of tongues 26 in direct contact with the upper surface of the spit 11. Then the slide clamps 13 are adjusted so that each flat strip portion 26 is located in the clearance 14 between the flat surface 11 of the spit and one of the slide clamps 13, whereupon the gridiron is securely fastened to the spit 11 simply by tightening of the setscrews 16. In this position, the gridiron is accurately centered and held securely on the spit and cannot become detached from the spit when meat is inserted between the two grids of the gridiron, and the whole assembly is then rotated in the rotisserie.

After the desired roasting operation has been completed and the roasted meat has been removed from the gridiron 18, the gridiron 18 can be easily detached from the spit 11 by loosening the setscrews 16 and shifting the slide clamps 13 outwardly to release the strip portions 26 of the tongues 24. The spit 11, the clamps 13 and the gridiron 18 can be easily cleaned as separate units, and as shown in dotted lines in Fig. 3, the tongues 24 can be folded back upon the inner surface of the grid 19 to be out of the way. The gridiron 18 then forms by itself a small, compact unit which requires very little storage space.

It will be understood that various modifications and variations of the invention will readily occur to those skilled in the art, and I want it to be understood that my invention is not limited to the specific embodiment described and illustrated, except as defined in the following claims.

What I claim is:

1. For use with a spit having a flat surface, the combination with a pair of prong-carrying slide clamps formed to embrace the spit with a certain clearance and including setscrews passing through tapped bores in the slide clamps for securing the slide clamps in desired positions on the spit, of a gridiron comprising two rectangular grids, means for securing the two grids together in superposed, registering positions, and two sheet metal tongues carried by one of said grids to be bisected by a common plane extending at right angles to and bisecting the grid, said tongues including flat terminal strip portions to project outwardly from the grid in opposite directions with their outer surfaces in a plane substantially coinciding with the outer surface of the grid, said strip portions having a substantially uniform width slightly less than that of the flat surface of the spit, a length considerably exceeding their width and a thickness less than the clearance between the slide clamps and the spit so that they can be inserted between said flat surface of the spit and the slide clamps and the gridiron can be secured to the spit by tightening of the setscrews.

2. For use with a spit having a flat surface, the combination with a pair of prong-carrying slide clamps formed to embrace the spit with a certain clearance and including setscrews passing through tapped bores in the slide clamps for securing the slide clamps in desired positions on the spit, of a gridiron comprising two rectangular grids, means for securing the two grids together in superposed, registering positions and two sheet metal tongues hinged to one of said grids at opposite sides thereof to be adjustable to operative and inoperative positions and to be bisected, in each position of the tongues, by a common plane extending at right angles to and bisecting the grid, said tongues including flat terminal strip portions which, in the operative positions of the tongues, project outwardly from the grid in opposite directions with their outer surfaces in a plane substantially coinciding with the outer surface of said grid, said strip portions having a substantially uniform width slightly less than that of the flat surface of the spit, a length considerably exceeding their width and a thickness less than the clearance between the slide clamps and the spit so that, in the operative positions of the tongues, the strip portions can be inserted between said flat surface of the spit and the slide clamps and the gridiron can be secured to the spit by tightening of the setscrews, said tongues, in their inoperative positions, being folded back upon the grid.

3. For use with a spit having a flat surface, the combination with a pair of prong-carrying slide clamps formed to embrace the spit with a certain clearance and including setscrews passing through tapped bores in the slide clamps for securing the slide clamps in desired positions on the spit, of a gridiron comprising two rectangular grids, means for securing the two grids together in superposed, registering positions, one of said grids comprising a rectangular wire frame, spaced apart parallel bars of smaller thickness extending across and overlying said frame on its outside and being secured to said frames, said bars defining the outer surface of said grid, and two sheet metal tongues having portions wrapped around the wire forming said frame on opposite sides of the frame to be adjustable to operative and inoperative positions and to be bisected, in each position of the tongues, by a common plane extending at right angles to and bisecting the grid, said tongues including terminal strip portions of a thickness not exceeding that of said bars and less than the clearance between the slide clamps and the spit, and which, in operative position of the tongues project outwardly from the grid in opposite directions with their outer surfaces in a plane substantially coinciding with said outer surface of the grid, said strip portions having a substantially uniform width slightly less than of the flat surface of the spit and a length considerably exceeding their width so that, in the operative positions of the tongues, the strip portions can be inserted between said flat surface of the spit and the slide clamps and the gridiron can be secured to the spit by tightening of the setscrews, said tongues, in the inoperative positions, being folded back upon the grid.

4. For use with a spit having a flat surface, the combination with a pair of prong-carrying slide clamps formed to embrace the spit with a certain clearance and including setscrews passing through tapped bores in the slide clamps for securing the slide clamps in desired positions on the spit, of a gridiron comprising two rectangular grids, means for securing the two grids together in superposed registering positions, one of said grids comprising a rectangular wire frame and spaced apart parallel bars of smaller thickness extending lengthwise across and overlying said frame on its outside and being secured to said frame, said bars defining the outer surface of said grid and a central one of said bars extending in a plane which bisects the grid at right angles thereto, and two sheet metal tongues having forked portions straddling said central bar from the outside and being wrapped around the wire forming said frame on opposite sides of the frame to be adjustable to operative and inoperative positions and to be bisected, in each position of the tongues, by said plane containing said central bar, said tongues including flat terminal strip portions of a thickness not exceeding that of the bars and less than the clearance between the slide clamps and the spit and which, in operative position of the tongues, project outwardly from the grid in opposite directions with their outer surfaces in a plane coinciding substantially with the outer surface of the grid, said strip portions having a substantially uniform width slightly less than that of the flat surface of the spit and a length considerably exceeding their width so that, in operative position of the tongues, the strip portions can be inserted between said flat surface of the spit and the slide clamps and the gridiron can be secured to the spit by tightening of the setscrews, said tongues, in their inoperative positions, being folded back upon the inner surface of the grid.

References Cited in the file of this patent

UNITED STATES PATENTS

| Number    | Name    | Date           |
|-----------|---------|----------------|
| 1,711,778 | Elbert  | May 7, 1929    |
| 2,225,861 | Dufour  | Dec. 24, 1940  |
| 2,545,818 | Larkin  | Mar. 20, 1951  |